(12) United States Patent
Liang

(10) Patent No.: US 7,756,918 B2
(45) Date of Patent: Jul. 13, 2010

(54) GROUP NETWORKING UTILIZING SCREENING METHODS

(76) Inventor: Chua Chien Liang, Block 205 Henderson Road, #03-02, Singapore (SG) 159459

( * ) Notice: Subject to any disclaimer, the term of this patent is extended or adjusted under 35 U.S.C. 154(b) by 883 days.

(21) Appl. No.: 10/519,234

(22) PCT Filed: Jun. 25, 2002

(86) PCT No.: PCT/SG02/00130

§ 371 (c)(1),
(2), (4) Date: Dec. 21, 2004

(87) PCT Pub. No.: WO04/001647

PCT Pub. Date: Dec. 31, 2003

(65) Prior Publication Data

US 2005/0262197 A1    Nov. 24, 2005

(51) Int. Cl.
*G06F 15/16* (2006.01)
*G06Q 10/00* (2006.01)
(52) U.S. Cl. ............................... 709/201; 705/1; 707/6
(58) Field of Classification Search .................. 707/7, 707/9, 3; 709/202, 204, 205, 218, 219; 705/1
See application file for complete search history.

(56) References Cited

U.S. PATENT DOCUMENTS

| | | | | |
|---|---|---|---|---|
| 5,631,904 | A * | 5/1997 | Fitser et al. ................. | 370/261 |
| 5,754,939 | A * | 5/1998 | Herz et al. .................. | 455/3.04 |
| 5,822,523 | A * | 10/1998 | Rothschild et al. .......... | 709/236 |
| 5,835,087 | A * | 11/1998 | Herz et al. .................. | 715/810 |
| 5,878,214 | A * | 3/1999 | Gilliam et al. .............. | 709/204 |
| 6,018,766 | A * | 1/2000 | Samuel et al. .............. | 709/218 |
| 6,247,043 | B1 * | 6/2001 | Bates et al. ................. | 709/200 |
| 6,466,932 | B1 * | 10/2002 | Dennis et al. ................ | 707/3 |
| 6,480,885 | B1 * | 11/2002 | Olivier ....................... | 709/207 |
| 6,487,583 | B1 * | 11/2002 | Harvey et al. ............... | 709/204 |
| 6,523,021 | B1 * | 2/2003 | Monberg et al. ............. | 707/2 |
| 6,529,882 | B1 * | 3/2003 | Park et al. ................... | 705/51 |
| 6,542,749 | B2 * | 4/2003 | Tanaka et al. ............. | 455/456.1 |
| 6,643,681 | B1 * | 11/2003 | Saito et al. .................. | 709/202 |
| 6,671,695 | B2 * | 12/2003 | McFadden .................. | 707/102 |
| 6,721,713 | B1 * | 4/2004 | Guheen et al. ................. | 705/1 |
| 6,785,681 | B2 * | 8/2004 | Keskar et al. ................ | 707/10 |
| 6,819,919 | B1 * | 11/2004 | Tanaka ..................... | 455/414.1 |
| 6,820,204 | B1 * | 11/2004 | Desai et al. ................... | 726/6 |

(Continued)

OTHER PUBLICATIONS

Stephen Fickas et al., "Join the Club, Enabling Self-Organizing Groups on the Net." web.archive.org/web/20010605100945 (2001).

(Continued)

*Primary Examiner*—Joseph Thomas
*Assistant Examiner*—Tae K Kim
(74) *Attorney, Agent, or Firm*—Paul & Paul

(57) ABSTRACT

A method to generate a group of entities from a plurality of participating entities, the method comprising: one of the participating entities expressing by indication which others of the participating entities they wish to meet; selecting to be a first member of the group an entity which has indicated at least one other of the participating entities it wishes to meet; adding a new entity to the group by selecting the new entity from the set of indications of the last member added to the group.

5 Claims, 3 Drawing Sheets

U.S. PATENT DOCUMENTS

| | | | |
|---|---|---|---|
| 6,910,081 B1* | 6/2005 | Hammond | 709/245 |
| 6,947,924 B2* | 9/2005 | Bates et al. | 707/3 |
| 7,047,212 B1* | 5/2006 | Pych et al. | 705/26 |
| 7,085,834 B2* | 8/2006 | Delany et al. | 709/225 |
| 7,092,952 B1* | 8/2006 | Wilens | 707/100 |
| 7,103,634 B1* | 9/2006 | Ullmann et al. | 709/206 |
| 7,107,311 B1* | 9/2006 | Zittrain et al. | 709/204 |
| 7,167,855 B1* | 1/2007 | Koenig | 707/3 |
| 7,203,674 B2* | 4/2007 | Cohen | 707/3 |
| 7,240,093 B1* | 7/2007 | Danieli et al. | 709/205 |
| 2001/0002469 A1* | 5/2001 | Bates et al. | 707/1 |
| 2002/0023090 A1* | 2/2002 | McGeachie | 707/102 |
| 2002/0023132 A1* | 2/2002 | Tornabene et al. | 709/205 |
| 2002/0046259 A1* | 4/2002 | Glorikian | 709/218 |
| 2002/0090911 A1* | 7/2002 | Evans et al. | 455/41 |
| 2002/0106066 A1* | 8/2002 | Swanson et al. | 379/196 |
| 2002/0112003 A1* | 8/2002 | Glorikian | 709/203 |
| 2002/0129135 A1* | 9/2002 | Delany et al. | 709/223 |
| 2002/0141560 A1* | 10/2002 | Khayatan et al. | 379/219 |
| 2002/0169835 A1* | 11/2002 | Paul et al. | 709/206 |
| 2003/0028524 A1* | 2/2003 | Keskar et al. | 707/3 |
| 2003/0055892 A1* | 3/2003 | Huitema et al. | 709/204 |
| 2003/0084103 A1* | 5/2003 | Weiner et al. | 709/205 |
| 2003/0093474 A1* | 5/2003 | Kakuta et al. | 709/204 |
| 2003/0153343 A1* | 8/2003 | Crockett et al. | 455/519 |
| 2003/0158936 A1* | 8/2003 | Knop et al. | 709/224 |
| 2003/0167344 A1* | 9/2003 | Danso | 709/249 |
| 2003/0208727 A1* | 11/2003 | Mortensen | 716/4 |

OTHER PUBLICATIONS

S. Fickas et al., "Joint the Club: Enabling Self-Organizing Groups on the Net," Archived Jun. 5, 2001; http://web.archive.org/web/2001060510945/http://www.igec.umbc.edu/kbem/final.fickas.pdf.

* cited by examiner

GROUP NETWORKING UTILIZING SCREENING METHODS

The present invention relates generally to generating groups to meet, enabling entities to meet other entities more effectively.

In a further form the present invention relates to a networking system and, more particularly, suited, although not exclusively, to business networking within a networked computer environment.

BACKGROUND

Meeting is arranged most commonly by methods like cold calling, exhibition, advertisement or through an intermediary party like an employment agency.

A problem which many salesmen, employers, employees, suppliers and investors face is that of making that vital first appointment to present and sell their ideas, goods, or indeed, themselves.

A "brute force" solution to the problem is what is sometimes known as cold calling wherein prospective clients or business partners are simply rung or otherwise approached without any specific invitation to do so and in the hope that the contact will nevertheless lead to a business relationship.

More general forms include exhibitions, seminars and membership of business associations.

Problems with these approaches include:
1. Cold calling generally produces negligible positive results;
2. Exhibitions only occur once every so often;
3. Business associations and membership of them does not of itself guarantee any form of common interest between the members sufficient to trigger business interaction.

It is an object of at least preferred embodiments of the present invention to address or ameliorate one or more of the above mentioned problems.

It is the aim of the present invention in at least preferred forms to supplement the above. It can be effective because there is no need to have elaborate set up like exhibitions; no need to go through the painful process of cold calling, no high expenses of advertisements or an intermediate agency.

BRIEF DESCRIPTION OF INVENTION

In this specification the phrase "link of indications" is a linear linkage of entities such that if entity A follows another entity B then A is in the set of indications of B.

Accordingly, in one broad form of the invention there is provided a method to generate a group of entities from a plurality of participating entities, said method comprising:
(a) One of said participating entities expressing by indication which others of said participating entities they wish to meet;
(b) Selecting to be a first member of the group an entity which has indicated at least one other of said participating entities it wishes to meet;
(c) Adding a new entity to the group by selecting said new entity from the set of indications of the last member added to said group.

Preferably indications of an entity are the set of other entities that said entity indicated it is interested in meeting.

Preferably the method further comprises repeatedly adding new members until at least one indication of the set of indications of the last new member added to said group includes one of the current members of the group.

Preferably the method further comprises using a look ahead method of choosing which one of the set of indications to choose from the last new member where the look ahead consists of N generations.

Preferably the first generation is the set of indications of the last new member and the Nth generation is the set of entities combined from the set of indications of all of the entities of N−1 generation.

Preferably if one of the entity (named X) from the first generation to the N generation is a member of the group, then the look ahead has succeeded and the new members added to the group will consist of the set of entities that follows the link of indications from the last new member to the entity that has said entity named X as a member of its set of indications.

Preferably the method further comprises using a look back method of choosing which one of the set of indications to choose from the last new member where the look back consists of N generations.

Preferably the first generation is the set of entities whose set of indications includes at least one of the current members of the group and the Nth generation is the set of entities whose set of indications include one of the entity of the N−1 generation.

Preferably if one entity (named X) from the first generation to the N generation is also the last new member of the group, then the look back has succeeded and the new members added to the group will consist of the set of entities that follows the link of indications from the last new member which is also said entity named X back to the first generation of the look back.

Preferably the method further comprises a combined look ahead and backwards; said method consisting of looking ahead N generations and looking backwards M generations where if there is an entity X that is common to the look ahead from 1 to N generations and the look back is from 1 to M generations, then the combined look ahead and backwards has succeeded and the new members added to the group will consist of the set of entities that follows the link of indications from the last new member to X and from X to the first generation of the look back.

Preferably the method further comprises repeatedly increasing N and M by steps of amount N1 and M1 until the combined look ahead and backwards has succeeded or N or M equal or exceed a predetermined value.

Preferably the entities under consideration are already preselected for in terms of having already indicated a common time and a common place to meet.

Preferably the method further comprises stopping the process of generation of new members of said group when the quantity of members of the group reaches a predetermined quantity.

In a preferred form the entities are people.

In an alternative preferred form the entities are corporations.

In a further preferred form the entities are corporations or people.

In a further broad form of the invention there is provided a system to generate groups to meet for the purpose of enabling participating entities to meet others of said participating entities more effectively, the system comprising:

a computer readable storage medium;
linkages to said participating entities by input/output devices;
wherein the particulars of said participating entities and indications can be fed in and stored in the computer readable storage medium and resultant groups generated posted to the entities via the same input/output devices; and computer programming stored on the storage medium.

Preferably the computer programming stored on said system is configured to be readable from the computer readable storage medium by a computer and thereby cause the computer to operate so as to:

pick an entity to be the first member of the group; add a new entity to the group by picking it from the set of indications of the last new member of group, where the set of indications of an entity are the set of other entities that an entity indicated it is interested in.

Preferably the process of generating groups is stopped when the quantity of the member of the group equals or exceeds a specific quantity.

Preferably the stored computer programming is further configured to cause the computer to operate so as to:

repeatedly add new members until the set of indications of the last new member include one of the current member of the group.

Preferably the stored computer programming is further configured to cause the computer to operate as to:

use a look ahead method of choosing which one of the set of indications to choose from the last new member where the look ahead consist of N generations.

Preferably the first generation is the set of indications of the last new member and the Nth generation is the set of entities combined from the set of indications of all of the entities of N-1 generation.

Preferably if one of the entity named X from the first generation to the N generation is a member of the group, then the look ahead has succeeded and the new members added to the group will consist of the set of entities that follow the link of indications from the last new member to the entity that has X as a member of its set of indications.

Preferably the stored computer programming is further configured to cause the computer to operate so as to:

use a look back method of choosing which one of the set of indications to choose from the last new member where the look back consists of N generations.

Preferably the first generation is the set of entities whose set of indications includes at least one of the current members of the group and the Nth generation is the set of entities whose set of indications include one of the entities of the N-1 generation.

Preferably if one of the entities now named X from the first generation to the N generation is also the last new member the group then the look back has succeeded and the new members added to the group will consist of the set of entities that follows the link of indications from the last new member which is also X back to the first generation of the look back.

Preferably the stored computer programming is further configured to cause the computer to operate so as to:

have a combined look ahead and back; said system consisting of looking ahead N generations and looking backwards M generations where if there is an entity X that is common to the look ahead from 1 to N generations and the look back from 1 to M generations then the combined look ahead and back has succeeded and the new members added to the group will consist of the set of entities that follow the link of indications from the last new member to X and from X to the first generation of the look back;

Preferably the system further includes repeatedly increasing N and M by steps of amount K until the combined look has succeeded or N or M exceeds a given value.

Preferably the stored computer programming is further configured to cause the computer to operate so as to:

enable the entities under consideration to be preselected for in terms of having already indicated a common time and place.

BRIEF DESCRIPTION OF DRAWINGS

Embodiments of the present invention will now be described with reference to the accompanying drawings wherein.

DETAILED DESCRIPTION OF PREFERRED EMBODIMENTS

Broadly, preferred forms of the present invention relate generally to a system and apparatus for generating groups to meet from amongst participating entities.

In a computerized method, entities that are participating would indicate which other entities they wish to meet. An individual is then selected to be the seed to grow the group that is to meet. This could be by various methods such as indicating directly or screening by characteristics or a combination screening and indicating or any other means. Each new member is added to the group from the entities that are in the indications of the latest entity that has joined the group. The process ends when the last entity added has in its indications a member that is already a member of the group or the group has reached a pre-determined maximum size.

To speed up the process, a look ahead, a look back as well as combine look are proposed. In one form the entities may be people. In another aspect the entities may be corporations. In another form aspect of the invention, the entities can be either corporations or people.

Figure 1:
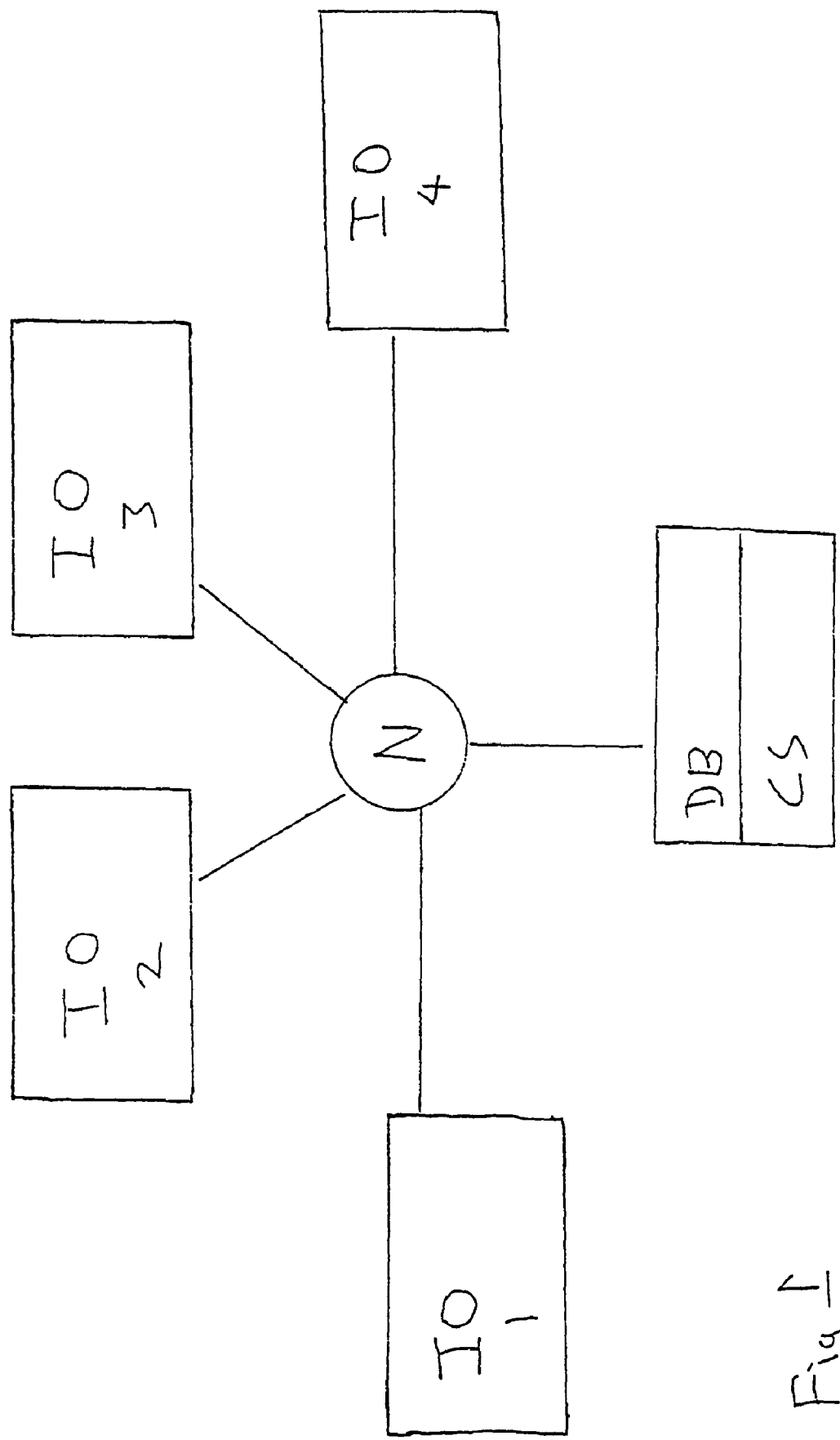
FIG. 1 is a block diagram of a system according to a first preferred embodiment of the present invention.

With reference to the drawings, FIG. 1 shows one embodiment of a "group for meeting" generating system. The system includes a central server (CS) that is use to store the database (DB). The input/output devices (IO1, IO2, IO3 . . . ) can be computers, mobile phones or any other suitable data input devices.

The network can be either a local area network, the internet or any other suitable medium for connecting the users to the database.

In one form the database can be implemented as an Access database running under the Microsoft Windows operating system, for example on an Intel platform. More sophisticated software may be utilized where the number of participants becomes very large.

Figure 2:
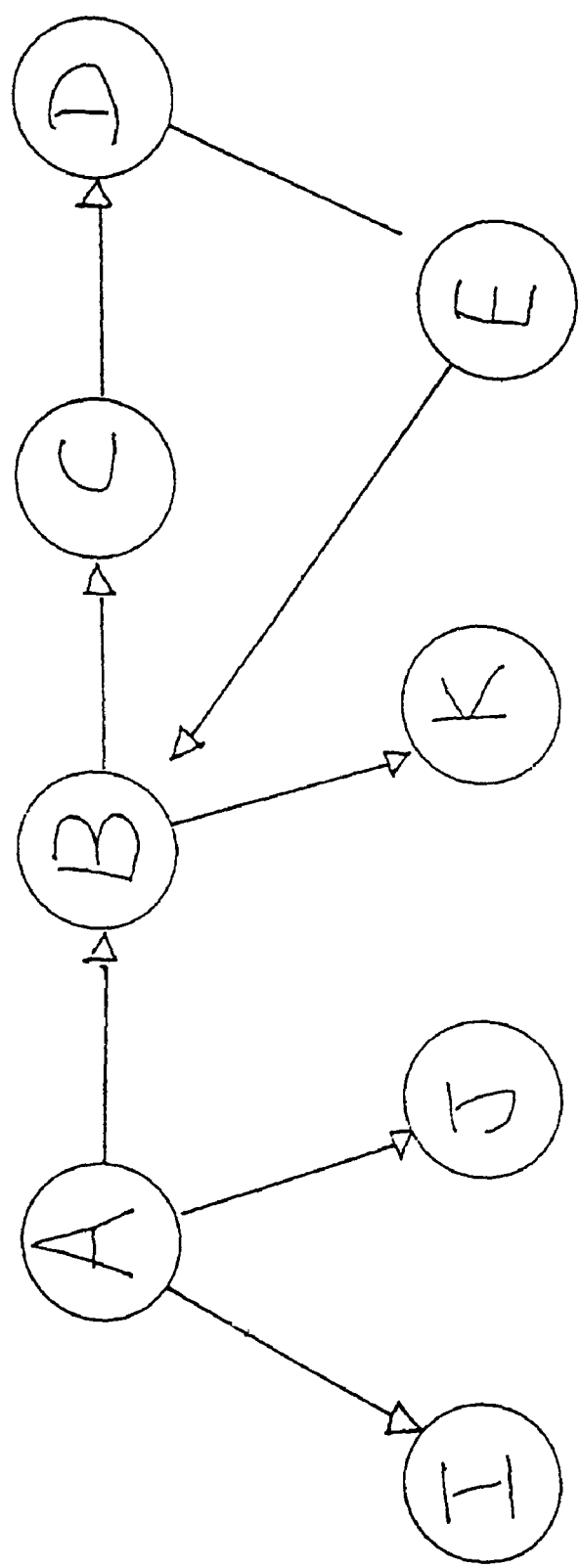
FIG. 2 is a block diagram of entities and their indications operable in association with the system of FIG. 1.

The entities in FIG. 2 can register in the database by means of the input/output devices. They can also by the same means view and give their indications of which other entities in the database they wish to meet.

In FIG. 2 entity A has in its indications the entity B, I, J. Entity B has in its indications C, K. This means that A would like to meet B, I or J. Entity B would like to meet C or K.

The central server can then generate the group by selecting an individual to be the seed to grow the group that is to meet, in this case A.

Figure 3:
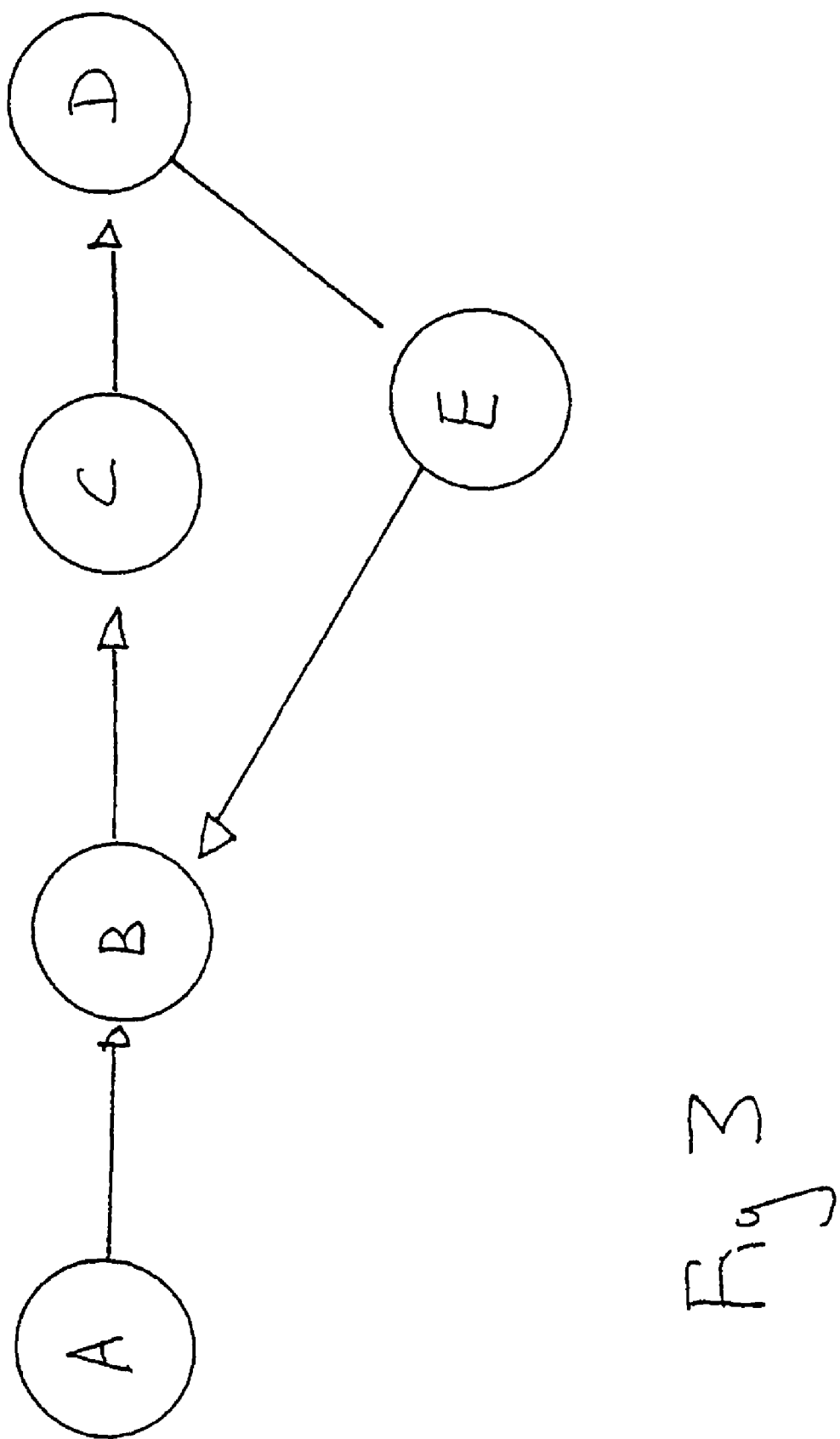
FIG. 3 is a block diagram of group formed from the entities in FIG. 2 following the system of FIG. 1.

Each new member is added to the group from the entities that are in the indications of the latest entity that has joined the group. In this instance, the process ends when the last entity added has in its indications a member that is already a member of the group as shown in FIG. 3.

Thus the group will grow in the order A, B, C, D, E with the seed being A and the last member being E. Note that E has B as a member of its indications and B also being already a member of the group the process can stop. This is because each member of the group has at least one of its indications already in the group.

SUMMARY

In one form, steps in at least some preferred embodiments of the present invention can be summarized as follows:
1. entities registering themselves in the database
2. each entity indicates which other entities in the database they find useful to meet
3. administrator to form interrelationships for each entity which have at least one other entity they find useful to meet and to come together in the same group
4. The groups are then notified of the place and time of meeting.
5. Step 1 can be repeated for new entities
6. Step 2 can be repeated whenever the entities chooses to do so
7. Step 3 to Step 4 can be repeated regularly.

The above describes only some embodiments of the present invention and modifications, obvious to those skilled in the art, can be made thereto without departing from the scope and spirit of the present invention.

The invention claimed is:

1. A method of generating a group of persons from a plurality of participating persons for enabling networking, said method comprising:
   (a) each participating person selecting a set of indications, the set of indications consisting only of at least one other participating person that said each participating person wishes to meet;
   (b) recording the set of indications in a database after selecting;
   (c) processing the set of indications recorded in the database by a computerized system to form the group, the processing comprising:
      (i) including as a first member of the group any participating person who has indicated at least one other participating person in the set of indications, thereby becoming a first last new member of the group;
      (ii) including the group only one other participating person indicated in the set of indications of the first last new member of the group, the one other participating person thereby then becoming the a second last new member of the group after joining the group, the second last new member of the group superseding the first last new member of the group, so that there is only one last new member of the group at any point in time;
      (iii) including in the group only one other participating person indicated in the set of indications of the second last new member of the group, the one other participating person thereby then becoming a third new member of the group after joining the group, the third last new member of the group superseding the second last new member of the group, so that there is only one last new member of the group at any point in time; and
      (iv) repeatedly including only one new person to the group from the set of indications of the last new member of the group until a new person to be included in the group is already included in the group.

2. The method as claimed in claim 1, wherein the plurality of participating persons are already pre-selected in terms of having already indicated a common time and a common place to meet.

3. The method of claim 1 wherein the set of indications is a list of other participating persons that a participating person wishes to meet.

4. A method of generating a group of persons from a plurality of participating persons for enabling networking, said method comprising:
   (a) each participating person selecting a set of indications, the set of indications consisting only of at least one other participating person that said each participating person wishes to meet;
   (b) recording the set of indications in a database after selecting;
   (c) processing the set of indications recorded in the database by a computerized system to form the group, the processing comprising:
      (i) including as a first member of the group any participating person who has indicated at least one other participating person in the set of indications, thereby becoming a first last new member of the group;
      (ii) including the group only one other participating person indicated in the set of indications of the first last new member of the group, the one other participating person thereby then becoming a second last new member of the group after joining the group, the second last new member of the group superseding the first last new member of the group, so method working in such a way that there is only one last new member of the group at any point in time;
      (iii) including in the group only one other participating person indicated in the set of indications of the second last new member of the group, the one other participating person thereby then becoming a third last new member of the group after joining the group, the third last new member of the group superseding the second last new member of the group, so that there is only one last new member of the group at any point in time; and
      (iv) repeatedly including only one new person the group from the set of indications of the last new member of the group until a new person to be included in the group is already included in the group.

5. The method of claim 4 wherein the set of indications is a list of other participating corporations that a participating corporation wishes to meet.

* * * * *

UNITED STATES PATENT AND TRADEMARK OFFICE
CERTIFICATE OF CORRECTION

| | | |
|---|---|---|
| PATENT NO. | : 7,756,918 B2 | Page 1 of 1 |
| APPLICATION NO. | : 10/519234 | |
| DATED | : July 13, 2010 | |
| INVENTOR(S) | : Chua Chien Liang | |

It is certified that error appears in the above-identified patent and that said Letters Patent is hereby corrected as shown below:

Column 5, line 45, insert the word --in-- after the word "including";

Column 5, line 48, delete the word "the";

Column 6, line 16 and line 17, replace the word "persons" with --corporations--;

Column 6, line 19, line 21 (both instances), line 29, line 30, line 33, line 35, line 42, line 44, line 49, and line 51, replace the word "person" with --corporation--;

Column 6, lines 38 to 39, delete the phrase "method working in such a way"; and

Column 6, line 49, insert the word --to-- before the word "the".

Signed and Sealed this
Twenty-fifth Day of January, 2011

David J. Kappos
*Director of the United States Patent and Trademark Office*